Dec. 26, 1944. R. G. STIGLER 2,365,914
BOTTLE CARRIER
Filed July 21, 1941
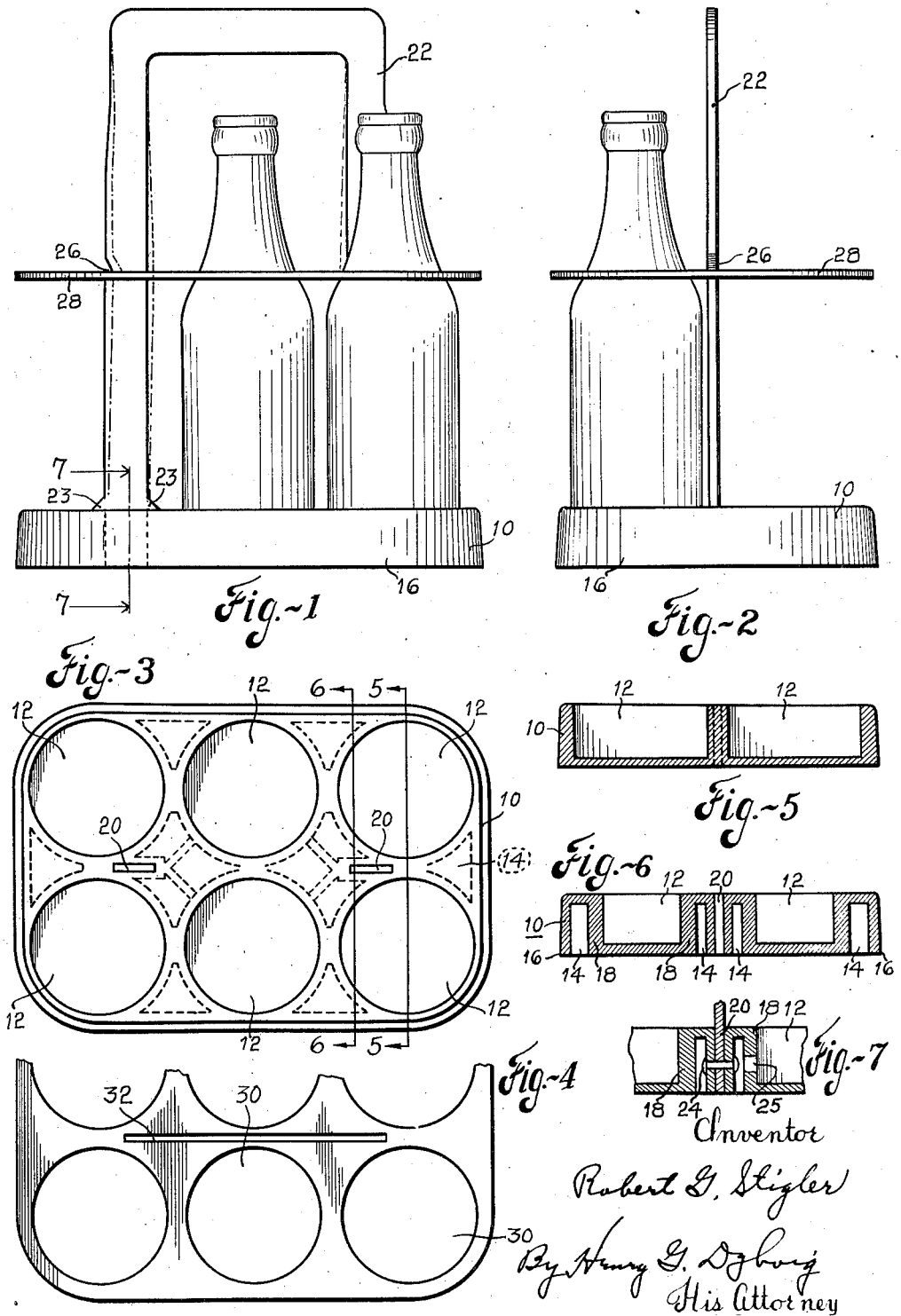
Inventor
Robert G. Stigler
By Henry G. Dzbong
His Attorney Patented Dec. 26, 1944

2,365,914

UNITED STATES PATENT OFFICE 2,365,914

BOTTLE CARRIER

Robert G. Stigler, Harrison Township, Montgomery County, Ohio, assignor to Standard Molding Corporation, Dayton, Ohio, a corporation of Ohio Application July 21, 1941, Serial No. 403,385

1 Claim. (Cl. 224—48).

This invention relates to a bottle carrier and more particularly to a bottle carrier made from plastic molding material.

An object of this invention is to provide a bottle carrier made from plastic molding material.

Another object of this invention is to provide a bottle carrier that is easily constructed, easily assembled, efficient, economical and durable.

Another object of this invention is to provide a bottle carrier that may be reused from time to time.

Another object of this invention is to provide a bottle carrier having a retainer snapped into position.

Another object of this invention is to provide a composite bottle carrier wherein the parts are made from plastic molding material.

Other objects and advantages reside in the construction of parts, the combination thereof and the mode of operation, as will become more apparent from the following description.

In the drawing,

Figure 1 discloses a side elevational view of the bottle carrier having two bottles mounted in the carrier.

Figure 2 is an end view showing at least one bottle on one side of the handle.

Figure 3 is a top plan view of the base with the handle removed.

Figure 4 is a fragmentary top plan view of the bottle retainer member removed from the assembly.

Figure 5 is a cross sectional view taken substantially on the line 5—5 of Figure 3.

Figure 6 is another cross sectional view taken substantially on the line 6—6 of Figure 3.

Figure 7 is a fragmentary cross sectional view taken substantially on the line 7—7 of Figure 1, so as to illustrate the connection between the handle and the base.

In the past numerous types of bottle carriers have been produced. Some have been produced from wood, a few from metal and the majority from cardboard. The cardboard bottle carriers are oftentimes made with the intention of being discarded after the first use. Possibly a few of the better cardboard bottle carriers and the metallic and wooden bottle carriers are reused. However, when reused, they usually become marred, scratched and mutilated, so as to have the appearance of being old.

The bottle carrier disclosed herein is made from plastic molding material that is resistant to wear, scratching and marring, that withstands abuse and misuse without mutilation, in that the plastic molding material is homogeneous, having the same color throughout. Furthermore, the plastic molding material results in a strong, rigid, lightweight bottle carrier, as will appear more fully from the detailed description of the device disclosed herein.

Referring to the drawing, the reference character 10 indicates a base that is provided with a plurality of cylindrical recesses or depressions 12, one for each of the bottles. In the particular embodiment disclosed, six such recesses have been shown. The number of recesses and the size thereof is a matter of choice, depending entirely upon the type of bottles used and the purpose to which the bottle carrier is to be put.

In order to economize on material and to reduce weight, the under side of the base 10 is provided with a plurality of cavities 14 resulting in a marginal flange 16 extending around the base. In some places this marginal flange merges into the walls 18 surrounding the recesses or depressions 12.

The base 10 is provided with a pair of rectangular shaped holes 20 each surrounded by a boss extending downwardly in a cavity. The holes 20 are adapted to receive the legs of an inverted U-shaped handle 22, there being one leg in each hole. The legs may be secured in position by suitable cement, or in the event the plastic molding material is soluble, by a homogeneous union caused by the application of a suitable solvent to the contacting surface. In Figure 7 the lower ends of the legs have been secured by a suitable rivet 24 inserted in position through a suitable aperture 25 in the wall 18. Shoulders 23 are found on the lower ends of the legs, so as to abut the top of the base.

Near the center and in the outer margin of each leg there is a V-notch 26, adapted to receive a retaining member 28, having a plurality of holes 30, one for each of the bottles. Said retaining member is provided with a longitudinal slot 32. The length of the longitudinal slot 32 is equal to the distance found between the bottoms of the V-notches 26. The upper end of the handle 22 is of less width than the bottom, the width of the upper end of the handle being substantially equal to the length of the slot 32, that is, the legs taper outwardly from top to bottom. This permits insertion of the retaining member 28 from the top of the handle, and as it is pushed downwardly, the legs of the handle are bower or sprung inwardly, so as to yield, thereby permitting the retaining member 28 to be snapped into position in the notches 26, which locks the retaining member in position. The carrier is preferably loaded with bottles before the retaining member is moved into position, so that the holes in the retaining member fit over the necks of the bottles loaded in the base 10. The retaining member 28 may be removed by manually springing the legs inwardly at the centers, then lifting the retaining member upwardly, so as to release the bottles, from which position the bottles may be dispensed.

The carrier is ready for reuse when desirable. It may be loaded with a fresh supply of bottles, the retainer reinserted into the notches 26. The plastic molding material, due to its inherent characteristics, results in a carrier maintaining the "new" appearance over a long period of time.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

A bottle carrier including a molded base member having a plurality of recesses in the top thereof one for each of the bottles, a plurality of cavities projecting upwardly from the under side between the recesses for the bottles, said base member having a pair of downwardly projecting bosses each provided with a hole extending through the top, an inverted U-shaped slightly resilient handle having the legs seated in said holes, means for fastening said legs in said holes, the outer margins of the legs being notched, and a retaining member having a slot through which the legs project, the notches in the margins of the legs engaging the retaining member held in position by the legs being flexed toward each other while inserting the retaining member so as to cause the notches to engage the ends of the slot, said retaining member having a plurality of holes one for each of the bottles so as to cooperate with the base to hold the bottles in position.

ROBERT G. STIGLER.